March 31, 1959 J. STATSINGER 2,879,669
VERTICAL SENSING DEVICE
Filed July 22, 1954 2 Sheets-Sheet 1
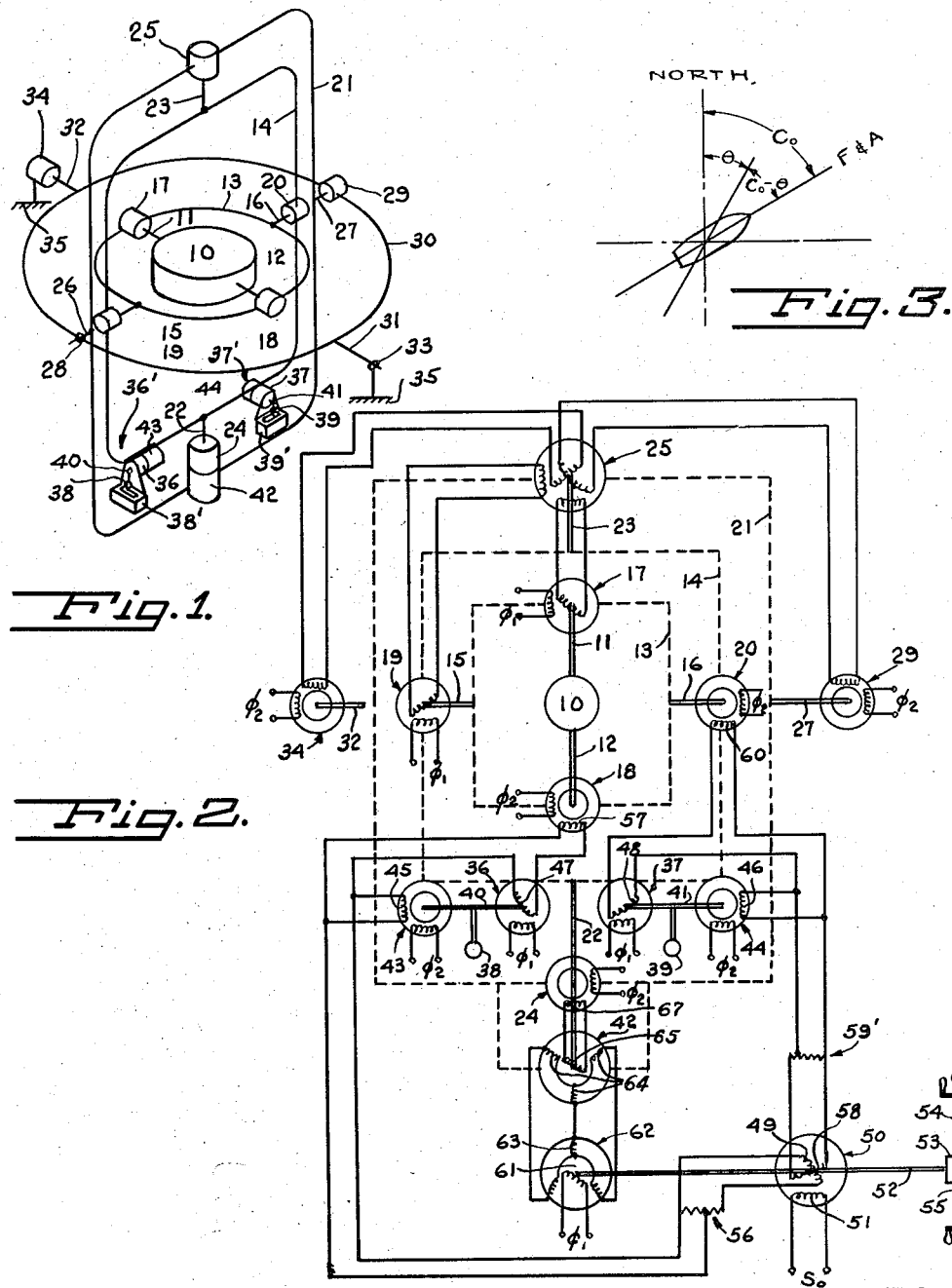
INVENTOR.
JOSEPH STATSINGER
BY
Raymond A. Paquin
ATTORNEY.

March 31, 1959  J. STATSINGER  2,879,669
VERTICAL SENSING DEVICE
Filed July 22, 1954  2 Sheets-Sheet 2

INVENTOR.
JOSEPH STATSINGER
BY
Raymond A. Paquin
ATTORNEY.

United States Patent Office 2,879,669
Patented Mar. 31, 1959

2,879,669

VERTICAL SENSING DEVICE

Joseph Statsinger, New York, N.Y., assignor to American Bosch Arma Corporation, a corporation of New York Application July 22, 1954, Serial No. 445,052

8 Claims. (Cl. 74—5,6)

The present invention relates to vertical sensing devices and has particular reference to means for counteracting the horizontal accelerations which act thereon to cause erroneous indications of the vertical.

Vertical sensing elements are best exemplified by the simple pendulum and will be referred to as such in the following description. Pendulums are used in gyroscopic devices such as compasses and stable elements to measure the displacement of a reference plane from the true vertical. Since the pendulum does not distinguish between gravitational and other accelerations, the effect of horizontal accelerations must be corrected in order to get a true indication of the deviation between the reference plane and the vertical.

Corrections must be made for the horizontal accelerations which result in a large degree from acceleration of the craft with respect to the earth, the centripetal accelerations due to the rotation of the earth and the rotation of the craft about the earth's axis and Coriolis acceleration. For these corrections precise information on the speed and course of the craft and its position on earth are required. These data are available from well known apparatuses which are not the subject of this invention, and will not be described here.

The usual approach to this problem is to calculate the effect of the error producing accelerations, to instrument the mathematical calculations and to apply the corrections to the pendulum as either a counteracting mechanical force or as an electrical signal to be subtracted from the output of the pendulum's signal producing pickoff. The calculations previously employed were designed to determine the deviation of pendulum from the vertical due to these horizontal accelerations by differentiation of vehicle speed. The instrumentation of these calculations required at least two differentiators of high accuracy which resulted in a relatively bulky and expensive apparatus. In addition, even differentiators of high accuracy are known to magnify otherwise negligible errors.

The present invention seeks to correct the signal from the pendulum without the necessity of differentiation by the joint action of two operations: First, the application of an additive force to the pendulum by mechanical means, and second, the subtraction of a signal proportional to this force from the output of the signal producing pickoff. The effects of these operations will become clear after the following discussion.

The response of a damped pendulum to horizontal accelerations can be described by the following differential equation:

$$\frac{1}{f_0^2}\frac{d^2B}{dt^2}+T\frac{dB}{dt}+B=\frac{a_\theta}{g} \quad (1)$$

Where $a_\theta$ is the horizontal acceleration of the pendulum pivot along the sensitive direction and is a function of time, $g$ is the acceleration of gravity, $B$ is the angular displacement of the pendulum from the vertical ($B$ is small so that $\sin B=B$ and $\cos B=1$), $f_0$ is the undamped natural frequency of the pendulum, $T$ is a constant proportional to the ratio of damping coefficient to the weight of the pendulous mass.

Since the pendulum is for use as a detector of the vertical rather than of vibrations, only the low frequency component of $a_\theta$ are of interest (between 0 and 2 cycles per second). Accordingly, if T is made large with respect to $$\frac{1}{f_0^2}$$

the response of the vertical sensing unit may be adequately expressed by the equation:

$$T\frac{dB}{dt}+B=\frac{a_\theta}{g} \quad (2)$$

The general expression for the total horizontal acceleration $a_\theta$ is:

$$a_\theta=a_n\cos\theta+a_e\sin\theta \quad (3)$$

Where $$a_n=\frac{dV_n}{dt}+2W_eV_e\sin\lambda+\frac{V_e^2}{R}\tan\lambda+RW_e^2\sin\lambda\cos\lambda \quad (4)$$

and $$a_e=\frac{dV_e}{dt}-2V_nW_e\sin\lambda-\frac{V_eV_n}{R}\tan\lambda \quad (5)$$

in which $V_n$ is the component of vehicle speed relative to earth in the north direction,
$V_e$ is the component of vehicle speed relative to earth in the east direction,
$W_e$ is the earth's siderial rate of rotation,
$R$ is the mean radius of the earth,
$\lambda$ is the instantaneous latitude, and
$\theta$ is the angle between the true north and the sensitive direction of the vertical sensing device measured in a horizontal plane, positive to east.

The several accelerations which combine to produce $a_n$ and $a_e$ are listed and explained as follows:

$\dfrac{dV_n}{dt}$ and $\dfrac{dV_e}{dt}$ are the horizontal north and east components of the acceleration relative to the earth, $2W_eV_e\sin\lambda$ is the horizontal component of Coriolis acceleration resulting from easterly travel of the craft and rotation of the earth, $\dfrac{V_e^2}{R}\tan\lambda$ is the horizontal component of the centrifugal acceleration due to own ships motion east, relative to earth, $RW_e^2\sin\lambda\cos\lambda$ is the horizontal component of the centrifugal acceleration due to the rotation of the earth, $-2V_nW_e\sin\lambda$ is the Coriolis acceleration resulting from northerly travel of the craft and the rotation of the earth, and $-\dfrac{V_eV_n}{R}\tan\lambda$ is an additional acceleration due to the easterly motion of the craft which modifies the Coriolis acceleration above. This component assumes importance as the speed of the craft approaches the speed of the earth.

It should be noted that the $RW_e^2\sin\lambda\cos\lambda$ term is generally not included in acceleration terms but rather in the definition of the true vertical, which would be defined by a plumb bob. In this invention however this term will be included in the horizontal acceleration and the vertical will be defined as the gravity vector, omitting the effect of centrifugal acceleration due to rotation of the earth.

In the special case of a slowly moving vehicle $V_n$ and $V_e$ are small so that Equations 4 and 5 become:

$$a_n = \frac{dV_n}{dt} + Rw_e^2 \sin \lambda \cos \lambda \quad (6)$$

$$a_e = \frac{dV_e}{dt} \quad (7)$$

If the centrifugal effect $Rw_e^2 \sin \lambda \cos \lambda$ is also neglected then:

$$a_\theta = \frac{dV_n}{dt} \cos \theta + \frac{dV_e}{dt} \sin \theta \quad (8)$$

Prior correction methods have computed $a_\theta/g$ according to Equation 8 by differentiation of speed components. $\frac{dV_n}{dt}$ and $\frac{dV_e}{dt}$ are determined from the relationships $V_n = S_o \cos C_o$ and $V_e = S_o \sin C_o$ or $$\frac{dV_n}{dt} = \frac{dS_o}{dt} \cos \theta - S_o \sin C_o \frac{dC_o}{dt}$$

and $$\frac{dV_e}{dt} = \frac{dS_o}{dt} \sin C_o + S_o \cos C_o \frac{dC_o}{dt}$$

The correction of Equation 8 is applied either electrically or mechanically to subtract the computed $a_\theta/g$ from the accelerometer output, whence Equation 2 becomes:

$$T \frac{dB}{dt} + B = \frac{a_\theta}{g} - \frac{a_\theta}{g} = 0 \quad (9)$$

In the steady state when $$\frac{dB}{dt}$$

becomes zero, $B$ must be zero so that the pendulum indicates the true vertical.

In the present invention, however, a force whose time derivative is proportional to the acceleration is added to the force on the pendulum and a quantity proportional to the force is subtracted from the pendulum indication of the vertical to give the true vertical.

In this connection consider the quantity $$U = \frac{1}{Tg}[V_n \cos \theta + V_e \sin \theta] \quad (10)$$

Then, when $\theta$ is a constant, $$\frac{dU}{dt} = \frac{1}{Tg}\left[\frac{dV_n}{dt} \cos \theta + \frac{dV_e}{dt} \sin \theta\right] \quad (11)$$

Comparison of Equation 11 with Equation 8 shows that $$\frac{dU}{dt} Tg = a_\theta \quad (12)$$

If now, a force proportional to $U$ is applied to the pendulum in a direction to increase the displacement Equation 2 becomes $$T \frac{dB}{dt} + B = \frac{a_\theta}{g} + U = T \frac{dU}{dt} + U \quad (13)$$

or, in differential operator notation, $$(Tp+1)B = (Tp+1)U \quad (14)$$

whence $$B = U \quad (15)$$

By subtracting a value proportional to $U$ from the indication of the pendulum, the output of the pendulum is corrected so that $B$ becomes zero, and an indication of the true vertical is thus obtained.

For a pendulum responsive to deviations from the vertical in the plane displaced by $90+\theta$ from the north, the total horizontal acceleration acting thereon is $$a_{(90+\theta)} = a_n \cos(90+\theta) + a_e \sin(90+\theta) \quad (16)$$

and $$a_{(90+\theta)} = \frac{dV_n}{dt} \cos(90+\theta) + \frac{dV_e}{dt} \sin(90+\theta) \quad (17)$$

Let $$X = \frac{1}{Tg}[V_n \cos(90+\theta) + V_e \sin(90+\theta)] \quad (18)$$

If $\theta$ is a constant, then $$\frac{dX}{dt} = \frac{1}{Tg}\left[\frac{dV_n}{dt} \cos(90+\theta) + \frac{dV_e}{dt} \sin(90+\theta)\right] \quad (19)$$

Comparing Equation 19 with Equation 17 shows that $$\frac{dX}{dt} Tg = a_{(90+\theta)} \quad (20)$$

Thus it will be seen that if a force proportional to $X$ is applied to the pendulum, as in the previous case and a value proportional to $X$ is subtracted from the pendulum indication the corrected indication will be the true vertical.

In the general case, where Equations 3, 4 and 5 apply, a force $Y$ whose time derivative is proportional to the acceleration can also be found, although in this case the orientation of the accelerometer is not constant but varies at a specific rate.

Let $$Y = \frac{1}{Tg}[V_n \cos \theta + V_e \sin \theta + Rw_e \cos \lambda \sin \theta]$$

$$= \frac{1}{Tg}[V_n \cos \theta + (V_e + Rw_e \cos \lambda) \sin \theta] \quad (21)$$

Then $$\frac{dY}{dt} = \frac{1}{Tg}\left[\frac{dV_n}{dt} \cos \theta + (V_e + Rw_e \cos \lambda) \cos \theta \frac{d\theta}{dt}\right.$$
$$\left. - V_n \sin \theta \frac{d\theta}{dt} + \left(\frac{dV_e}{dt} - Rw_e \sin \lambda \frac{d\lambda}{dt}\right) \sin \theta\right] \quad (22)$$

Since $$\frac{d\lambda}{dt} = \frac{V_n}{R}$$

Equation 22 can be rewritten $$\frac{dY}{dt} = \frac{1}{Tg}\left\{\left[\frac{dV_n}{dt} + V_e \frac{d\theta}{dt} + Rw_e \cos \lambda \frac{d\theta}{dt}\right] \cos \theta\right.$$
$$\left. + \left[\frac{dV_e}{dt} - V_n \frac{d\theta}{dt} - 2V_n w_e \sin \lambda\right] \sin \theta\right\} \quad (23)$$

When $$\frac{d\theta}{dt} = \frac{V_e}{R} \tan \lambda + w_e \sin \lambda \quad (24)$$

is substituted in Equation 23, the following expression for $$\frac{dY}{dt}$$

is obtained:

$$\frac{dY}{dt} = \frac{1}{Tg}\left\{\left[\frac{dV_n}{dt} + 2w_e V_e \sin \lambda + \frac{V_e^2}{R} \tan \lambda\right.\right.$$
$$\left. + Rw_e^2 \sin \lambda \cos \lambda\right] \cos \theta$$
$$\left. + \left[\frac{dV_e}{dt} - 2V_n w_e \sin \lambda - \frac{V_e V_n}{R} \tan \lambda\right] \sin \theta\right\} \quad (25)$$

Comparison of Equation 25 with Equations 3, 4 and 5 shows that $$Tg\frac{dY}{dt}=a_\theta, \text{ or } T\frac{dY}{dt}=\frac{a_\theta}{g} \qquad (26)$$

The force proportional to Y is applied positively to the pendulum and from Equation 2, $$T\frac{dB}{dt}+B=\frac{a_\theta}{g}+Y$$

or, $$T\frac{dB}{dt}+B=T\frac{dY}{dt}+Y \qquad (27)$$

and, in differential operator notation, $$(Tp+1)B=(Tp+1)Y \qquad (28)$$

Whence $$B=Y$$

When the indication of the pendulum is corrected by subtracting a value proportional to Y, the corrected indication will define the true vertical. It should be noted that the pendulum must be rotated in azimuth at a rate $$\frac{d\theta}{dt}$$

which is defined by the Equation 24 in this general case.

For a second vertical sensing device, or pendulum, which is orthogonally disposed to the first, the total horizontal acceleration acting thereon is $$a_{(90+\theta)}=a_n \cos (90+\theta)+a_e \sin (90+\theta)$$

or $$a_{(90+\theta)}=-a_n \sin \theta+a_e \cos \theta \qquad (29)$$

Now, let Z be the force applied to this pendulum where $$Z=\frac{1}{Tg}[-V_r \sin \theta + (V_e+Rw_e \cos \lambda) \cos \theta] \qquad (30)$$

Following the same procedure as just outlined above, it will be found that $$\frac{dZ}{dt}=\frac{1}{Tg}\left\{-\left[\frac{dV_n}{dt}+2w_eV_e \sin \lambda\right.\right.$$
$$\left.+\frac{V_e^2}{R}\tan \lambda + Rw_e^2 \sin \lambda \cos \lambda\right] \sin \theta$$
$$\left.+\left[\frac{dV_e}{dt}-2V_nw_e \sin \lambda - \frac{V_eV_n}{R}\tan \lambda\right]\cos \theta\right\}$$
$$(31)$$

Thus, if a force proportional to Z is applied to the pendulum, the pendulum is rotated in azimuth at a rate $$\frac{d\theta}{dt}$$

defined by Equation 24 and a value proportional to Z is subtracted from the output of the pendulum, the corrected output will indicate the true vertical.

For a better understanding of the present invention, reference may be had to the accompanying diagrams in which:

Fig. 1 shows a typical gyroscopic instrument for slow craft;

Fig. 2 is a schematic circuit diagram of the acceleration correction device as applied to the instrument of Fig. 1;

Fig. 5 is a schematic circuit of the acceleration correction as applied to the instrument of Fig. 4.

Figure 3:
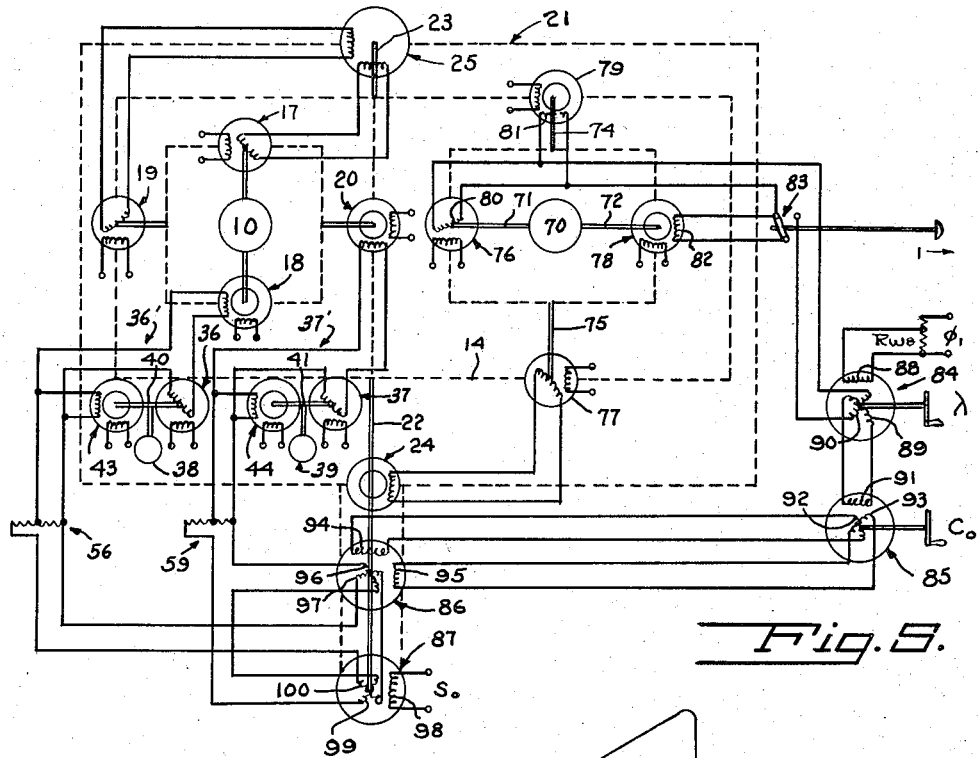
Fig. 3 is an explanatory diagram.

With reference now to Fig. 1, a vertical spin axis gyro 10 is mounted by shafts 11, 12 in gimbal ring 13 and the gimbal ring 13 is supported in frame 14 by the shafts 15, 16. Shafts 11 and 15 are terminated in respective pick off devices 17 and 19, while shafts 12 and 16 are terminated in torque motors 18 and 20 respectively. Frame 14 is mounted for rotation about a vertical axis in the vertical gimbal 21 having its vertical shafts 22 and 23 terminated in the motor 24 and resolver 25 respectively, both of which are carried by gimbal 21. Gimbal 21 is supported from the deck 35 of the craft carrying the gyroscope by a Cardan suspension in which shafts 26 and 27 of gimbal 21 are journalled in bearing 28 and motor 29 respectively carried by gimbal ring 30, and shafts 31, 32 of gimbal ring 30 are journalled in bearing 33 and motor 34 respectively which are supported from the deck 35.

Frame 14 carries the two vertical sensing devices 36' and 37' which are adapted to indicate the vertical in orthogonally displaced planes. These vertical sensing devices may use rotary pickoffs 36 and 37 for example, in which the stators are carried by frame 14 and pendulums 38 and 39 are suspended from the respective rotor shafts 40 and 41. Mechanical damping devices 38' and 39' provide viscous damping for the pendulums 38 and 39 in order that the condition the T the ratio of damping coefficient to pendulum mass is much greater than $$\frac{1}{f_0^2}$$

where $f_0$ is the undamped natural angular frequency of the pendulum, may be realized.

Gimbal 21 carries the stator of a synchro control transformer 42, the rotor of which is driven by the shaft 22.

The electrical connections between the elements of Fig. 1 are shown schematically in Fig. 2, which also shows the acceleration correction circuit. The usual amplifiers, phase shifter, scaling devices and the like which are required for successful operation are omitted from Fig. 2 in the interest of clarity. This illustrative circuit is described as using specific alternating current components, although any component performing similarly can be substituted. Also, a similar circuit can be devised using direct current without departing from the invention.

It will be quickly recognized that the gyroscopic instrument itself is essentially a conventional stable vertical. Thus, the displacement of shafts 22, 23 from the spin axis of gyro 10 is detected in the mutually perpendicular planes by the pickoffs 17 and 19, the outputs of which energize the resolver 25. Resolver 25 acts as a coordinate transformer, and supplies voltages to the roll and pitch gimbal motors 34 and 29 which drive the inner gimbal structure until the outputs of pickoffs 17 and 19 are zero and the axis through shafts 22 and 23 is parallel to the spin axis of gyro 10.

The pendulums 38 and 39, used to detect the tilt of frame 14 out of the vertical therefore indicate the tilt of the gyro 10 out of the vertical and energize the torque motors 18 and 20 accordingly. The torque motors 18 and 20 apply torque to the gyro 10 such as to cause precession of the gyro spin axis into the vertical.

This brief description should suffice to indicate the operation of the stable vertical and will be well understood by those in the art. A more detailed description of a similar stable vertical will be found in copending application Serial No. 738,242, filed March 29, 1947, by George Agins for "Instrument Stabilization System" and assigned to the assignee of this application.

It is known that vertical sensing devices such as pendulums are adversely affected by accelerations other than gravity as discussed earlier, and the gyro will not be erected into the vertical unless the effects of the error producing accelerations are removed from the pendulum indication.

In one embodiment of the method proposed by this invention, the shafts 40, 41 of pendulum pickoff devices 36, 37 are connected to the respective rotors of torque motors 43, 44 the stators of which are carried by the frame 14. The voltage which energizes the control field windings 45 and 46 of motors 43 and 44 respectively is also subtracted from the output of the respective rotor windings 47 and 48 of the pickoff devices 36 and 37.

Referring back to Equations 10 and 18, it will be recalled that to realize the acceleration compensation, the torque motor 43 should apply a force proportional to $$\frac{1}{Tg}(V_n \cos \theta + V_e \sin \theta)$$

to the pendulum 38. Similarly, the torque motor 44 should apply a force proportional to $$\frac{1}{Tg}[V_n \cos(90+\theta) + V_e \sin(90+\theta)]$$

or $$\frac{1}{Tg}(V_e \cos \theta - V_n \sin \theta)$$

to the pendulum 39.

To this end, the control winding 45 of motor 43 is connected to the output of secondary winding 49 of resolver 50, the primary winding 51 of which is energized by a voltage proportional to the speed of the craft $S_o$ and the secondary windings of which are displaced according to $(C_o-\theta)$ by the output shaft 52 of differential 53. One input shaft 54 of differential 53 is displaced according to $C_o$ by a repeater from the compass (not shown) while the other input shaft 55 is displaced according to a constant value $\theta$, which is preferably zero for simplicity so that shaft 53 is displaced according to $(C_o-\theta)$.

The $(C_o-\theta)$ displacement may be obtained by use of electromechanical devices such as synchro differentials and servo motors connected in the well known manner instead of in the manner shown in Fig. 2, if desired.

Thus, the output of resolver secondary winding 49 is proportional to $S_o \cos(C_o-\theta)$ or $$S_o \cos C_o \cos \theta + S_o \sin C_o \sin \theta$$

But $S_o \cos C_o$ is equal to $V_n$, and $S_o \sin C_o$ is equal to $V_e$. Therefore, the output of secondary winding 49 is proportional to $V_n \cos \theta + V_e \sin \theta$. This voltage is applied to the scaling device 56 which may be a resistance voltage divider having a ratio proportional to $$\frac{1}{Tg}$$

between input and output, and the output of the scaling device 56 energizes the control field winding 45 of the torque motor 43, so that the motor applies a torque proportional to $$\frac{1}{Tg}(V_n \cos \theta + V_e \sin \theta)$$

to the pendulum 38.

The control field winding 57 of torque motor 18 is energized jointly by the outputs of secondary winding 47 of pickoff device 36 and by the output of the voltage divider 56 whence the voltage energizing control field winding 57 is proportional to the tilt of frame 14 about the axis through shafts 11—12, according to the principles discussed earlier.

The output of the other secondary winding 58 of resolver 50 is applied to control field winding 46 of torque motor 44 through the voltage divider 59′, whence the motor 44 applies a torque proportional to $$\frac{1}{Tg}(V_e \cos \theta - V_n \sin \theta)$$

to pendulum 39. The voltage energizing the control field winding 60 of torque motor 20 is the difference between the output of the pickoff device 37 and the output of voltage divider 59′. It will be seen that the control field winding 60 is energized according to the tilt of the frame 14 out of the vertical about the axis through shafts 15, 16 in accordance with the principles set forth earlier.

The condition that $\theta$ must be constant, that is, that the sensitive planes of the vertical sensing devices do not change, is fulfilled by the following means; the shaft 52 drives the rotor winding 61 of a self-synchronous generator 62 the stator of which is immovable with respect to the deck 35. The rotor winding 61 is energized by $\phi$, thereby inducing in stator windings 63 positional signals representative of $(C_o-\theta)$, or the displacement of the vertical sensing device 36 from the fore-and-aft line of the craft, as can be seen from Fig. 3. The stator windings 63 are connected to the stator windings 64 of self-synchronous control transformer 42, the rotor winding 65 of which is connected to energize the control field winding 67 of motor 24 and is driven by shaft 22.

Assuming that the supports for motor 34 and bearing 33 are aligned fore-and-aft, the voltage energizing motor 24 is a function of the error between the actual rotation of shaft 22 or gimbal frame 14 and the desired rotation of $\theta°$ from the north. Thus, motor 24 is energized to drive the frame 14 into the position where the vertical sensing device 36 is sensitive to tilts in the vertical plane displaced by $\theta°$ from the north.

It has been shown that for rapidly moving craft the assumptions made in arriving at the design of the instrument of Figures 1 and 2 are not valid, and that a slightly different correction must be made. Mainly, the accelerometers must be rotated in azimuth at a constant rate, $d\theta/dt$. Also, an additional force, proportional to the product of $Rw_e \cos \lambda$ and the sine of the angle between the true north and the sensitive plane of the vertical sensing device, must be applied to the vertical sensing device and a voltage proportional to this force must be subtracted from the indication of the vertical sensing device.

Figure 4:
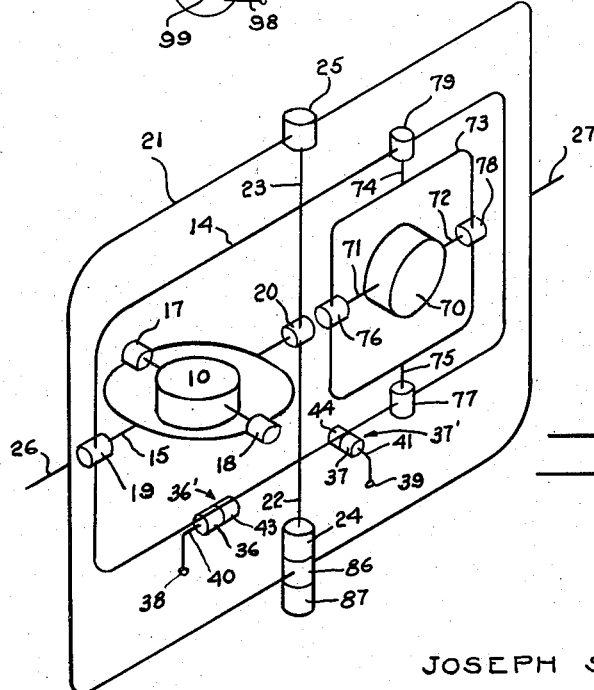
Fig. 4 shows a preferred construction for a gyro vertical for rapidly moving craft.

A preferred embodiment of a modification for use on rapidly moving craft is shown in Figures 4 and 5, in which components similar to those of Figures 1 and 2 are similarly numbered. It will be seen that the gimbal 14 is extended to accommodate a horizontal spin axis gyroscope 70, which is supported for rotation about horizontal shafts 71 and 72 in the gimbal frame 73, and is also adapted for rotation about a vertical axis through shafts 74, 75 which support the gimbal frame 73 in the gimbal 14.

Shafts 72 and 74 are driven by the motors 78 and 79 respectively, the stators of which are carried in the respective gimbals 73 and 14. Shafts 71 and 75 are connected to the rotors of pickoff devices 76 and 77 respectively, the stators of which are carried in the respective gimbals 73 and 14.

In the operation of the stable vertical, the output of pickoff device 77 energizes the motor 24 to maintain correspondence between the planes of frames 14 and 73, or provides a follow-up of frame 14 with respect to frame 73. As before, the gimbal frame 21 is stabilized by the action of pickoff devices 19 and 17, resolver 25 and motors 29 and 34 (not shown in Fig. 4), to follow the position of gyro 10.

Initially, the axis of gyroscope 70 is aligned with the meridian by making the gyroscope 70 act as a compass. To this end, the output of rotor winding 80 of pickoff device 76 is applied to the control field winding 81 of motor 79 and also to control field winding 82 of motor 78 in series with a signal proportional to $Rw_e \sin \lambda$ through the switch 83. The $Rw_e \sin \lambda$ voltage is supplied from the secondary winding 90 of resolver 84 as will be explained later. The pickoff 76 detects the tilt of the spin axis of gyro 70 from the horizontal, since the stator of pickoff 76 is held in the vertical frame 73, and a proportional torque is applied to the gyro 70 to cause precession in azimuth. Motor 79 produces the damping which causes the gyro 70 to settle on the meridian with its axis horizontal and the $Rw_e \sin \lambda$ signal provides the latitude correction to keep the spin axis horizontal.

When the gyroscopic system has reached a steady state condition, switch 83 is operated to remove the signal from control field winding 82, so that gyro 70 is free to rotate in azimuth, but the spin axis is kept horizontal by the action of torque motor 79 and pickoff 76. The rate of rotation of the gyro 70 in azimuth is the vertical component of the rotation of the craft about the earth's axis. The craft moves with respect to earth in the east direction at a speed $V_e$, or about the earth's axis at a rate $$\frac{V_e}{R \cos \lambda}$$

The earth rotates at a rate $W_e$, so that the total rate of rotation about the earth's axis is $$\left(\frac{V_e}{R \cos \lambda} + W_e\right)$$

and the vertical component of this rate of rotation is $$\left[\frac{V_e}{R \cos \lambda} + W_e\right] \sin \lambda$$

or $$\frac{d\theta}{dt}$$

from Equation 24.

Thus, since the frame 14 follows the gyro 70, the frame 14, which carries the vertical sensing devices 36′, 37′, rotates in azimuth at a rate $$\frac{d\theta}{dt}$$

The voltages energizing torque motors 43 and 44 and subtracted from the outputs of pickoffs 36, 37 must be proportional to the right hand expression of Equations 21 and 31 respectively to provide the acceleration correction of this invention.

The computer for this purpose comprises resolvers 84, 85, 86 and 87. The primary or stator winding 88 of resolver 84 is energized by a fixed voltage proportional to $Rw_e$, while the rotor or secondary windings 89 and 90 are displaced from the stator windings 88 according to the latitude $\lambda$. The output of winding 90 is, therefore, proportional to $Rw_e \sin \lambda$ and is utilized in the initial alignment of gyro 70 as previously explained. The output of winding 89 is proportional to $Rw_e \cos \lambda$, and is applied to energize the stator or primary winding 91 of resolver 85. The rotor or secondary windings 92 and 93 are displaced according to $C_o$, the course of the vessel, so that the secondary voltages are proportional respectively to $Rw_e \cos \lambda \cos C_o$ and $Rw_e \cos \lambda \sin C_o$. Rotor winding 92 is connected to energize one stator or primary winding 94 of resolver 86 and rotor winding 93 is connected to energize the other stator or primary winding 95 of resolver 86.

The stators of resolvers 86 and 87 are carried by frame 21 while the rotors are connected to shaft 22 of frame 14. Since the frame 14 is positioned according to the angle $\theta$, and frame 21 is positioned according to the angle $C_o$, the displacement of the rotor with respect to the stator of the resolvers 86 and 87 is $(C_o - \theta)$.

The outputs of secondary or rotor windings 96, 97 of resolver 86 are respectively proportional to $E_{96} = Rw_e \cos \lambda \sin C_o \cos (C_o - \theta)$
$\qquad - Rw_e \cos \lambda \cos C_o \sin (C_o - \theta)$ and $E_{97} = Rw_e \cos \lambda \sin C_o \sin (C_o - \theta)$
$\qquad + Rw_e \cos \lambda \cos C_o \cos (C_o - \theta)$ It follows that $E_{96} = Rw_e \cos \lambda \{\sin [C_o - (C_o - \theta)]\} = Rw_e \cos \lambda \sin \theta$ and $E_{97} = Rw_e \cos \lambda \{\cos [C_o - (C_o - \theta)]\} = Rw_e \cos \lambda \cos \theta$ The primary or stator winding 98 of resolver 87 is energized by a voltage proportional to the speed of the craft, available from the crafts speed indicator (not shown). The outputs of the secondary or rotor windings 99, 100 are, therefore, proportional to $S_o \cos (C_o - \theta)$ and $S_o \sin (C_o - \theta)$ or $S_o \cos C_o \cos \theta + S_o \sin C_o \sin \theta$ and $S_o \sin C_o \cos \theta - S_o \cos C_o \sin \theta$ respectively. Since $S_o \cos C_o$ is equal to $V_n$ and $S_o \sin C_o$ is equal to $V_e$, $E_{99} = V_n \cos \theta + V_e \sin \theta$ and $E_{100} = V_n \sin \theta + V_e \cos \theta$ Secondary windings 96 and 99 are connected in series with the input of voltage divider 59 and secondary windings 97 and 100 are connected in series with the input of voltage divider 56, each of the voltage dividers having a ratio of output to input voltage of $$\frac{1}{Tg}$$

The output of voltage divider 59 is therefore $$\frac{1}{Tg}[V_n \cos \theta + V_e \sin \theta + Rw_e \cos \lambda \sin \theta]$$

or, Y of Equation 21, and the output of voltage divider 56 is $$\frac{1}{Tg}[-V_n \sin \theta + V_e \cos \theta + Rw_e \cos \lambda \cos \theta]$$

or Z of Equation 30.

It will be recalled that the output of voltage divider 56 energizes control field winding 45 of motor 43 and is also subtracted from the output of windings 47 of pickoff device 36, so that the voltage energizing motor 18 is proportional only to the tilt of the frame 14 in the sensitive plane of the pendulum 38. Similarly, the output of voltage divider 59 energizes control field winding 46 of motor 44 and is also subtracted from the output of winding 48 of pickoff device 37, so that the voltage energizing motor 20 is proportional only to the tilt of the frame 14 in the sensitive plane of pendulum 39.

It should be noted that a great many other special cases could be described using different ways of controlling the angle $\theta$ and selecting the appropriate correction function. The underlying principles common to all of these cases, as demonstrated in the introduction, are as follows:

(1) Control the angle $\theta$ in a manner such that a correction function can be chosen which involves only velocity terms and has the property that the derivative of this function with respect to time, multiplied by a constant is equal at all times to the horizontal acceleration caused by the vertical detector.

(2) Apply this correction function, suitably scaled, as an additive force to moving mass of the vertical detector.

(3) Apply the same function, suitably scaled as a subtraction quantity to the output of the vertical detector. The net output of the device is then fully corrected for horizontal accelerations.

I claim:

1. In a device of the character described, a vertical sensing device, an output device actuated by said vertical sensing device to produce a voltage proportional to the angular displacement between said vertical sensing device and its support, a torque motor operatively connected to said vertical sensing device and a correction voltage connected to energize said torque motor and simultaneously connected to the output of said output device to modify said output.

2. In a device of the character described, a support, a vertical sensing device carried by said support and including a pendulum, an output device actuated by said pendulum to produce a voltage proportional to the angular displacement between said pendulum and its support, a torque motor operatively connected to said vertical sensing device and a correction voltage connected to energize said torque motor and simultaneously connected to the output of said output device to modify said output.

3. In a device of the character described, a support, a vertical sensing device carried by said support and including a pendulum, an output device actuated by said pendulum to produce a voltage proportional to the angular displacement between said pendulum and its support, a torque motor operatively connected to said vertical sensing device, a resolver energized according to the speed of the support and adjusted according to the angle between the sensitive plane of said vertical sensing device and the north, electrical connections between the output of said resolver the input of said torque motor to energize said motor and electrical connections between the output of said resolver and the output of said output device to modify the output of said output device.

4. In a device of the character described, a vertical sensing device normally adversely affected by horizontal accelerations, means for deriving a force whose derivative with respect to time is proportional to said accelerations, means for applying said force to said vertical sensing device and means for modifying the indication of said vertical sensing device according to said force to thereby eliminate the effect of said horizontal accelerations.

5. In a device of the character described, a support, a vertical sensing device carried on said support, gyroscopically controlled means for orienting said vertical sensing means in azimuth, said means driving said vertical sensing device with respect to earth at a rate proportional to the vertical component of the rate of rotation of said support about the earth's axis, means for applying a horizontal force to said vertical sensing device according to a value whose derivative with respect to time is proportional to horizontal accelerations of said support, and means for modifying the output of said vertical sensing device according to said value.

6. In a device of the character described, a support, a vertical sensing device carried by said support and having its sensitive plane at an angle with respect to true north, means for determining the horizontal speed of said support in said plane, means for controlling said angle in a manner such that the time derivative of said speed in said plane is proportional to the horizontal acceleration of said support in said plane, means for applying a force to said sensing device which is proportional to said horizontal speed in the sensitive plane and acts in the same direction as the horizontal acceleration forces and means for modifying the output of said sensing device according to a function of said speed whereby said sensing device is made insensitive to horizontal accelerations.

7. In a device of the character described, a support, a vertical sensing device carried by said support and having its sensitive plane at an angle with respect to true north, a second vertical sensing device carried by said support and having its sensitive plane orthogonal to said first plane, means for determining the horizontal speed of said support in said planes, means for controlling said angle in a manner such that the time derivative of said speeds in said planes are proportional to the horizontal accelerations of said support in said planes, means for applying a horizontal force to each of said sensing devices which is proportional to said horizontal speed in the respective sensitive plane and acts in the same direction as the horizontal acceleration forces and means for modifying the output of said sensing devices according to said speeds whereby said sensing devices are made insensitive to horizontal accelerations.

8. In gyroscopic instruments, a vertical sensing device for producing an indication of the true vertical, damping means for suppressing the response of said vertical sensing device to high frequency vibrations, means for producing a function from velocity information whose time derivative is proportional to the horizontal acceleration of said instruments, means for applying an additive force to said vertical sensing device according to said function, means for subtracting from the output of said sensing device a value proportional to said function to provide an indication of the true vertical unaffected by horizontal accelerations.

References Cited in the file of this patent

UNITED STATES PATENTS

| | | |
|---|---|---|
| 1,083,370 | Luyken | Jan. 6, 1914 |
| 2,293,092 | Wittkuhns | Aug. 18, 1942 |
| 2,419,063 | Fischer | Apr. 15, 1947 |
| 2,501,885 | Barnes et al. | Mar. 28, 1950 |
| 2,608,867 | Kellogg | Sept. 2, 1952 |
| 2,620,669 | Braddon | Dec. 9, 1952 |
| 2,752,792 | Draper et al. | July 3, 1956 |

FOREIGN PATENTS

| | | |
|---|---|---|
| 912,182 | France | Apr. 23, 1946 |
| 615,734 | Great Britain | Jan. 11, 1949 |